United States Patent [19]

Gudden et al.

[11] 4,048,502
[45] Sept. 13, 1977

[54] ELECTRO-OPTICAL TRANSDUCER

[75] Inventors: Friedrich Gudden, Erlangen; Herbert Weiss, Munich, both of Germany

[73] Assignee: Siemens Aktiengesellschaft, Berlin & Munich, Germany

[21] Appl. No.: 608,323

[22] Filed: Aug. 27, 1975

[30] Foreign Application Priority Data

Sept. 4, 1974 Germany .............................. 2442276

[51] Int. Cl.$^2$ .............................................. G01T 1/22
[52] U.S. Cl. ...................................... 250/370; 357/52
[58] Field of Search ...................... 357/52, 31; 250/370

[56] References Cited

U.S. PATENT DOCUMENTS

| | | | |
|---|---|---|---|
| 3,529,161 | 9/1970 | Oosthoek | 250/370 |
| 3,615,913 | 10/1971 | Shaw | 357/52 |
| 3,684,592 | 8/1972 | Chang | 357/52 |
| 3,737,702 | 6/1973 | Kooi et al. | 357/31 |
| 3,812,361 | 5/1974 | Prag et al. | 250/370 |

*Primary Examiner*—Harold A. Dixon
*Attorney, Agent, or Firm*—Hill, Gross, Simpson, Van Santen, Steadman, Chiara & Simpson

[57] ABSTRACT

An electro-optical transducer which encompasses, within a vacuum tube, a constructional element having an alkali metal and a constructional element having a semi-conductor. The semi-conductor constructional element is rendered insensitive with respect to alkali metals. This is achieved in that the surface of the semi-conductor is at least partly covered with a layer or coating of polyimide.

4 Claims, 3 Drawing Figures

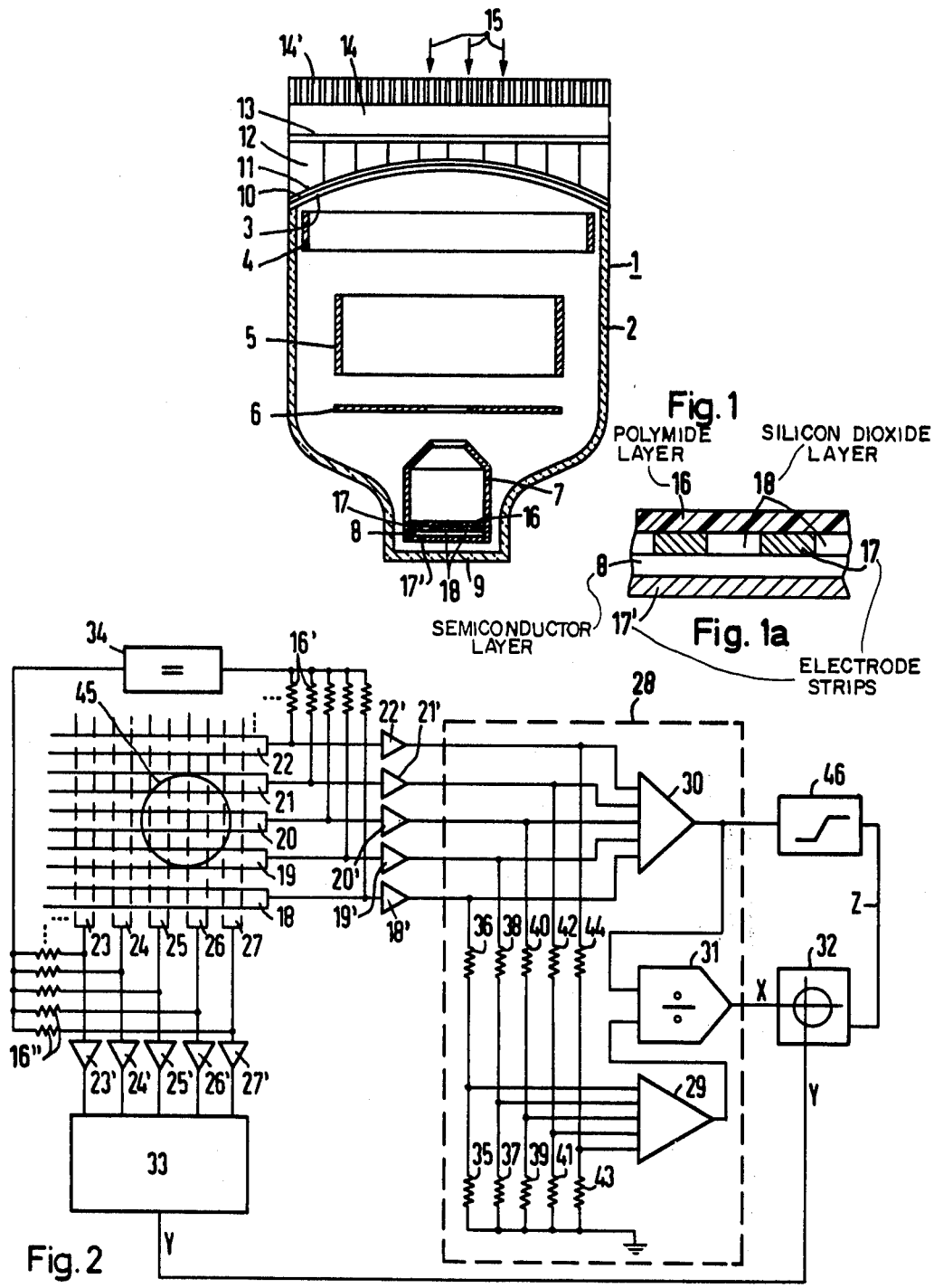

4,048,502

ELECTRO-OPTICAL TRANSDUCER

FIELD OF THE INVENTION

The present invention relates to an electro-optical transducer which encompasses, within a vacuum tube, a constructional element having an alkali metal and a constructional element having alkali metal and one such with a semi-conductor.

DISCUSSION OF THE PRIOR ART

Electro-optical transducer arrangements are known, such as a gamma camera in accordance with U.S. Pat. No. 3,812,361 which encompasses, in a vacuum tube, a constructional element which is provided with an alkali metal, as well as a detector whose essential component is a constructional element constituted of a semi-conductive material.

Arrangements of the above-mentioned type are generally gamma-cameras, electron multipliers and so forth, wherein electrons are released at an alkali metal-photocathode. These electrons are then subsequently converted into electrical signals via a semi-conductive constructional element. In these arrangements it is, however, disadvantageous that semi-conductors as they are generally employed in photocathodes, are attacked by alkali metals namely such as potassium or cesium, and changed with regard to their properties.

SUMMARY OF THE INVENTION

Accordingly, it is an object of the present invention to provide an electro-optical transducer or gamma image tube pursuant to the above-mentioned type, wherein the semi-conductor constructional element is rendered insensitive with respect to alkali metals. This object is inventively achieved in that the surface of the semi-conductor is at least partly covered with a layer or coating of polyimide.

Due to the coating or convering of the free surface of the part constituted of a semi-conductor, for example, a semi-conductor element, and/or semi-conductor oxide, with polyimide, there is obtained an electrically-insulating layer on the surface of the semi-conductor, which exerts no influence over the effect of the semi-conductor, and which prevents the access of alkali metals to the semi-conductor. In that manner there is avoided the formation of surface charges on the semi-conductor, causing under their influence easily electrically-conductive layers in the semi-conductor surface, which will decisively influence the function of the constructional element. Additionally, alkali metals are bound in the polyimide, for example, by means of same mechanism, or in the form of solid solutions. In this manner, the alkali metal is prevented from effecting the semi-conductor or, respectively, the semi-conductor oxide, and an electrically-conductive alkali metal layer cannot be formed.

The surface which is to be protected may thus be coated with a lacquer which contains the polyimide. This coating, as far as necessary, may then be hardened through the intermediary of heating. The thereby formed electrically-insulating layer prevents alkali atoms from forming a coherent electrically-conductive layer, as well as from diffusing through the plastic material to the semi-conductor.

For the production of only partly, meaning intermittent coverings, as may be necessary or suitable for contacts or terminals and for the laying free of active areas, use may be made of the so-called photo-resistor technique, meaning of the possibility that the plastic material through a photo-lattice like polymerization may be made attack-impervious for a subsequent treatment. In both processes, after sealing by means of a mask, the plastic material is so influenced at the desired locations through a correspondingly effective light that later, treated with solvents or etching means, in the first instance, it remains removable at the exposed locations and, in the second instance remain removable at the unexposed locations. Through the use of suitable covering masks there may be thus obtained any desired structure.

The thickness of the lacquer layers may vary within wide limits, since the foregoing relates only to a thick coating. Layers or coatings which are thinner than 5 $\mu$m, approximately 0.1 to 1 $\mu$m, evidence the advantage that they permit the passage of electrons with energies which are higher than a few kv. Under circumstances, in the previously referred to thin layers, such as in the use of sufficiently accelerated electrons, the entire active surface may be coated as a unit by means of the protective layer. Thus, for example, in a gamma camera there is obtained a satisfactory protection of the employed semi-conductor against the effect of alkali metal, which must be vapor deposited on the photocathode when the tube has already also been finally and completely provided with the constructional element having the semi-conductor. Thereby, by means of the coating, there may be also covered other layers which are applied to the semi-conductor part, such as electrically active layers, in effect, contacts or terminals, electrodes, insuluating layers and the like.

BRIEF DESCRIPTION OF THE DRAWINGS

Further advantages and features of the invention may now be ascertained in greater detail from the following description of an exemplary embodiment thereof, taken in conjunction with the accompanying drawings; in which:

FIG. 1 is a cross-sectional view through an image intensifier which contains within its vacuum tube, in addition to an alkali metal-containing photocathode, an inventively coated semi-conductor element;

FIG. 1a is a fragmentary section, on an enlarged scale, of the semi-conductor element pursuant to FIG. 1 and in which the electrodes are also coated by means of the polyimide layer; and FIG. 2 is a schematic block diagram of an electronic circuit which is adapted to provide for the operation of the image intensifier illustrated in FIG. 1.

DETAILED DESCRIPTION

In FIG. 1 of the drawings, an image intensifier is identified by reference numeral 1, in whose glass bulb or vacuum tube 2, a cathode or layer 3 is located at the inlet end thereof which, in the illustrated converter or transducer, consists of antimony and is activated with cesium. Connected thereto are circular electrodes 4, 5 and 6 which are located concentrically with the cathode 3, as well as an anode 7. The anode is closed off through the intermediary of a semi-conductor plate 8 which has a semi-conductor structure serving as a detector, and which is located at the output-ended window 9 of the tube 2. Applied ahead of the inlet window 10, by means of a coupling layer consisting of silicon oil, is a photo-conductive arrangement 12 which, at its free end, is connected with a scintillation crystal 14 by means of a further coupling layer 13 similarly consisting of silicon oil. In lieu of the silicon oil there may also be substituted other coupling media, such as the known optical cements.

The organs which are marked by gamma rays, in the present instance, are reproduced on the crystal 14 with the aid of a parallel aperture collimator 14'. The gamma rays, which are indicated by arrows 15, penetrate the apertures of the collimator 14' and are then absorbed in the scintillation crystal 14 while emitting light. The formed light is then transmitted to the photocathode 3 through the glass rods 12 which operate as light conductors, and the photocathode is thus caused to emit electrons. By means of the electrodes 4 through 7, in a known manner the electrons are then electron-optically reproduced on the semi-conductor plate 8. Plate 8 is coated, on the side thereof facing towards the cathode layer 3, with a layer 16 formed of polyimide which is thinner than 5 $\mu$m. Additionally applied to this side of the plate 8, which is coated with the layer 16, are electrode strips 17. The opposite side of the plate 8 is similarly provided with strip-shaped electrodes 17'. The electrodes 17 which face towards the cathode 3 consists of p-diffused strips which are contacted at their respective ends with aluminum. Between the strips of the electrode 17 in the embodiment according to FIG. 1a, in which the layer 16 lies outwardly, meaning that it faces towards the cathode 3, there is applied a layer 181 of silicon dioxide ($SiO_2$). The strips 17' which face towards the end window 9, whose direction is rotated through 90° with respect to the strips 17, in both embodiments (FIG. 1 and FIG. 1a) consist of vapor-deposited aluminum.

The semi-conductor plate 8, in the above-mentioned exemplary embodiments, currently consists of n-type silicon. The plate is approximately 300 $\mu$ thick and has a diameter of approximately 30 mm. Together with the electrodes 17 and 17' it forms the semi-conductor structure of the image intensifier 1. An electron spot 45 (FIG. 2) which, for example, is emitted by the rays 15 and reproduced by means of the electron optic arrangement of the image intensifier encompassing the electrodes 3 through 7, emits only electron aperture pairs in individual strips, as may be partially seen in FIG. 2. These are then collected for the localization of the plate at which there is an incidence of the rays 15. The crossing points of electron strips 17 and 17' which are impinged upon by the electron spot are hereby effective as surface closure layer detectors in the sense of counting diodes.

The determination of the impinging location of an electron spot 45, respectively, the center thereof, results in a known manner by means of an analog focal formation. For reasons of improved clarity, illustrated in FIG. 2 are only a few of the actually present electrode strips, which are respectively connected, through high-ohmic resistances 16' and 16", with an associated voltage source 34. As illustrated in FIG. 2, collected in the strips 18 through 22 and the thereto transversely located electrode strips 23 through 27, are the electron aperture pairs which are formed by an electron beam 45, and then amplified in charge-sensitive preamplifiers 18' through 22' and 23' through 27', respectively into further processable signals. The signals $X_i$, which are presently associated with the i-strips 18 through 22, and whose magnitude corresponds to the charge carrier collected on one side from the electron spot 45, are evaluated in a coordinate network 28 corresponding to the position of the associated electrode strips. $i$ is the number of the continual count of the strips, and $x$ signifies the $x$ coordinate. During the evaluation, the signal $X_i$, with the aid of a voltage divider, has a factor $a_i$ impressed thereon from the resistances 35 through 44. Through suitable selection of the resistances 35 through 44, the weighting or evaluating factors $a_i$ represent discrete coordinate values of the particular strips $i$ in the X-direction. As suitable selection there are hereby utilized resistances which provide voltage dividers whose relationship corresponds to that of $a_i$ and which provides for $i/i_{max}$. Thereby, $i$ is the continual and $i_{max}$ the largest present number of the strips. Moreover, the sum of both resistances of each voltage divider is equal.

The weighted signals $a_i x_i$ are then added in a summator or summing amplifier 29. There is thus obtained a signal $\Sigma\, a_i x_i$ from which, after division in a quotient former 31, through a summing signal of all unweighted signals $x_i$ obtained by the summing amplifier 30, there follows a normalized locating signal $$X = \frac{\Sigma\, a_i x_i}{\Sigma\, x_i}.$$

The X-signal and the Y-signal, which is formed in a corresponding manner with the aid of the rear-sided contact strips 23 through 27 in the coordinate network 33 (identical to 28), in the present instance, are transmitted to the reproducing element 32 of an XY-oscilloscope, and scanned bright with a Z-signal which is obtained through impulse magnitude discrimination of the unweighted summing signal $\Sigma\, x_i$ of the single-channel discriminator 46. Thereby, in the XY-diagram of the focal point of the electron beam which impinges onto the semi-conductor plate, and thereby the original absorption locals of the gamma quantum, there is produced a predetermined energy in the scintillation crystal.

While there has been shown what is considered to be the preferred embodiment of the invention, it will be obvious that modifications may be made which come within the scope of the disclosure of the specifiction.

What is claimed is:

1. In a gamma-image tube having a vacuum chamber, a photocathode means positioned within said chamber and having an alkali metal therein, a semiconductor means positioned within said chamber in spaced relation to said photocathode means and so as to have a major semiconductive surface thereof facing said cathode means, and a plurality of electrode strips positioned at least on said major semiconductive surface of the semiconductor means so as to define a pattern of electrode-free semiconductive areas; the improvement comprising:

a layer composed of a polyimide positioned on at least said electrode-free semiconductive areas of the major surface of said semiconductor means facing said photocathode, said layer having a thickness of less than 5 $\mu$m.

2. In a gamma-image tube as defined in claim 1 wherein the electrode-free semiconductive areas of the major surface of the semiconductor means are provided with a layer of a silicon dioxide and the polyimide layer is positioned on the respective surfaces of the electrode strips and the dioxide layer which faces the photocathode means.

3. In a gamma-image tube as defined in claim 2 wherein said dioxide layer is of a thickness about equal to the thickness of an individual electrode strip.

4. A gamma image tube as claimed in claim 1, said polyimide covering layer having a thickness in the range of 0.1 to 1.0 $\mu$m.

* * * * *